(12) United States Patent
Bojanowski et al.

(10) Patent No.: US 11,777,131 B1
(45) Date of Patent: Oct. 3, 2023

(54) MODULAR STACKING TOOL AND METHOD FOR A BATTERY

(71) Applicant: Ford Global Technologies, LLC, Dearborn, MI (US)

(72) Inventors: Paul John Bojanowski, Macomb Township, MI (US); Brian Utley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 17/718,980

(22) Filed: Apr. 12, 2022

(51) Int. Cl.
  *H01M 10/04* (2006.01)
  *H01M 10/42* (2006.01)
(52) U.S. Cl.
  CPC ... *H01M 10/0404* (2013.01); *H01M 10/4207* (2013.01); *Y10T 29/53135* (2015.01)
(58) Field of Classification Search
  None
  See application file for complete search history.

(56) References Cited

U.S. PATENT DOCUMENTS

| | | | |
|---|---|---|---|
| 2018/0083306 A1* | 3/2018 | Melack | H01M 10/0404 |
| 2021/0257653 A1* | 8/2021 | Ono | B65G 57/035 |
| 2021/0288344 A1 | 9/2021 | Dietze et al. | |
| 2021/0296741 A1 | 9/2021 | Koetting et al. | |
| 2022/0363499 A1* | 11/2022 | Abe | B65H 31/34 |

FOREIGN PATENT DOCUMENTS

| | | |
|---|---|---|
| KR | 101713042 | 3/2017 |
| KR | 102192298 | 12/2020 |
| WO | 2021096248 | 5/2021 |

* cited by examiner

*Primary Examiner* — Alix E Eggerding
(74) *Attorney, Agent, or Firm* — Burris Law, PLLC

(57) ABSTRACT

A battery module locating tool includes a support pillar and a plurality of fixtures supported on the support pillar. Each fixture is individually translatable along the support pillar and arranged to locate a battery cell according to a longitudinal datum and a lateral datum. The support pillar is movable toward and away from a battery frame onto which the battery cell is located.

20 Claims, 10 Drawing Sheets

MODULAR STACKING TOOL AND METHOD FOR A BATTERY

FIELD

The present disclosure relates to battery manufacturing and more particularly to methods and tools for stacking and aligning battery cells.

BACKGROUND

The statements in this section merely provide background information related to the present disclosure and may not constitute prior art.

Precise alignment of battery cells when constructing a battery can be difficult. Small tolerance build-ups may add up when multiple cells are stacked on top of each other, and portions of individual battery cells may interfere with alignment of other adjacent battery cells. The misalignment of battery cells can reduce battery performance and cause packaging constraints for batteries in a vehicle.

The present disclosure addresses the challenges with manufacturing a battery.

SUMMARY

This section provides a general summary of the disclosure and is not a comprehensive disclosure of its full scope or all of its features.

In one form, a battery module locating tool includes a support pillar and a plurality of fixtures supported on the support pillar. Each fixture is individually translatable along the support pillar and arranged to locate a battery cell according to a longitudinal datum and a lateral datum. The support pillar is movable toward a battery frame onto which the battery cell is located.

In variations of the tool, which may be implemented individually or in combination: the battery module locating tool further includes a track, the support pillar and the plurality of fixtures being slidable along the track toward the battery frame; the plurality of fixtures are configured to locate a plurality of battery cells vertically along the battery frame; each fixture includes a lateral wall and a longitudinal finger, the lateral wall corresponding to the lateral datum and the longitudinal finger corresponding to the longitudinal datum; the longitudinal finger includes a rounded edge; the rounded edge extends along a length of the longitudinal finger; each fixture is arranged to locate an adhesive disposed on a vertical surface of a respective battery cell onto a vertical surface of an adjacent battery cell; the plurality of fixtures are arranged to locate a plurality of battery cells into a stack, and the plurality of fixtures are further arranged to move away from the battery cells upon completion of the stack; the support pillar is movable along a track to move the fixtures away from the stack; each fixture is a same size as each other fixture.

A method for assembling a plurality of battery cells, the method includes locating each cell of the plurality of battery cells with individual locating fixtures, each locating fixture comprising a lateral datum and a longitudinal datum, stacking individual battery cells onto each other with respective individual locating fixtures to form a stack of battery cells, and removing the individual locating fixtures after forming the stack of battery cells.

In variations of the method, which may be implemented individually or in combination: the method further includes placing a first battery cell against a first locating fixture, thereby locating the first battery cell with the lateral datum and the longitudinal datum, lowering a second locating fixture onto the first locating fixture, and then placing a second battery cell onto the second locating fixture; each locating fixture includes a lateral wall and a longitudinal finger, the lateral wall comprising the lateral datum and the longitudinal finger comprising the longitudinal datum; the longitudinal finger includes a rounded edge; the method further includes moving the locating fixtures away from the stack in a longitudinal direction; moving the locating fixtures along a track away from the stack; adhering each battery cell to an adjacent battery cell with an adhesive; each locating fixture is a same size as each other locating fixture; the method further includes locating each locating fixture to an adjacent locating fixture to align the battery cells into the stack; translating each locating fixture vertically down along a support pillar to receive the battery cell.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
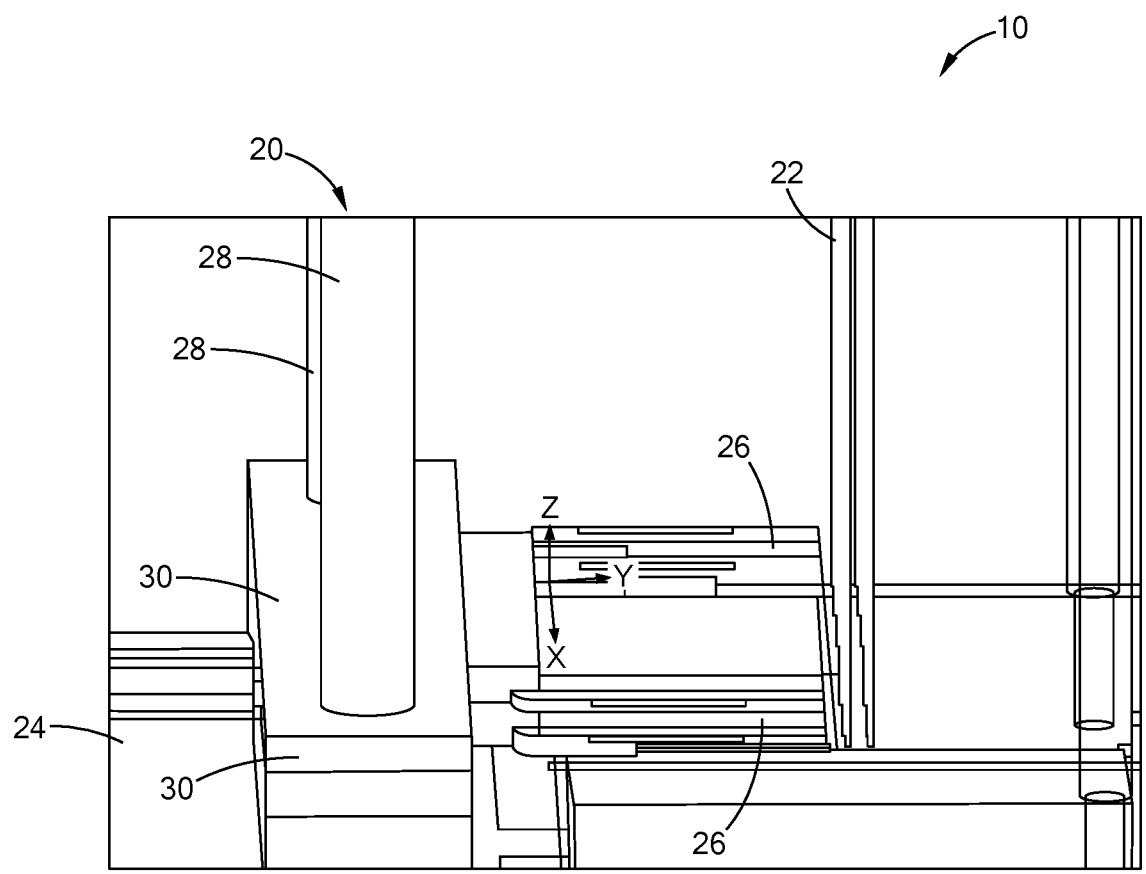
FIG. 1 is a perspective view of a battery module locating tool according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a system for forming a battery module 10 includes a battery module locating tool 20, a battery frame 22, a track 24, and a plurality of battery cells

26. The battery module locating tool 20 includes a support pillar 28 and a plurality of fixtures 30 slidably disposed on the support pillar 28. In general, the battery module locating tool 20 is configured to dimensionally locate the plurality of battery cells 26 along the battery frame into a stack, i.e., a linear arrangement of the battery cells 26. The system defines three orthogonal axes: a lateral axis noted with the letter X (i.e., an X-axis), a longitudinal axis noted with the letter Y (i.e., a Y-axis), and a vertical axis noted with the letter Z (i.e., a Z-axis). Each axis defines a direction, i.e., the X-axis defines a lateral direction, the Y-axis defines a longitudinal direction, and the Z-axis defines a vertical direction.

The support pillar 28 is translatable along the track 24, along the Y-axis or longitudinally, toward the battery frame 22. The track 24 includes a slidable feature, such as a bearing or a wheel (not shown), that allows the support pillar 28 to move the fixtures 30 toward the battery frame 22. The support pillar 28 moves the fixtures 30 toward the battery frame, as shown in FIG. 1, to form the stack of battery cells 26. Then, when the stack is completed, the support pillar 28 moves along the track 24 away from the battery frame 22 and the stack. The track 24 extends along the Y-axis, and the support pillar 28 moves in the longitudinal direction along the track 24 in one form of the present disclosure. It should be understood, however, that the support pillar 28 and fixtures 30 may be movable (whether slidable or otherwise movable) in any orthogonal direction while remaining within the scope of the present disclosure.

Each fixture 30 is individually movable, and in the form illustrated and described herein translatable along the support pillar 28. In the form of FIG. 1, the fixtures 30 are vertically translatable, as described in greater detail below, along two support pillars 28. The fixtures 30 are movable in the vertical direction (i.e., along the Z axis) to arrange the battery cells 26 into the stack. That is, each fixture 30 moves along the length of the support pillars 28 onto the battery frame 22 or onto another fixture 30 to position one of the battery cells 26 into the stack, as described in greater detail below. In the form of FIG. 1, each fixture 30 is a same size as each other fixture 30. Alternatively, not shown in the figures, at least one of the fixtures 30 is a different size/ geometric configuration than another fixture 30, which is a function of the configuration of each battery cell 26. For example, one fixture 30 may be thicker than adjacent fixtures 30 to accommodate a larger/thicker battery cell 26. Accordingly, the battery module locating tool 20 is modular and can accommodate a variety of sizes and configurations of battery cells 26.

Figure 2:
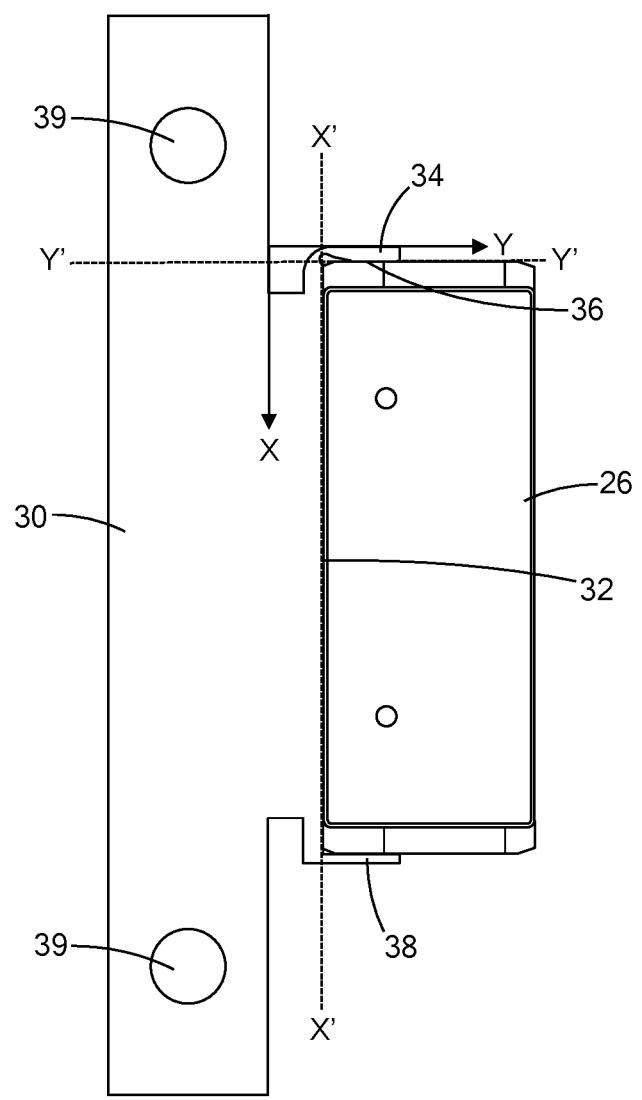
FIG. 2 is a plan view of a locating fixture and a battery cell according to the present disclosure.

With reference to FIG. 2, one of the fixtures 30 is arranged to locate one of the battery cells 26 according to a longitudinal datum Y' and a lateral datum X'. In this context, a "datum" is a specified location in three-dimensional space to which dimensional tolerances are referenced, and the fixture 30 includes features that dimensionally locate the battery cell 26 according to one or more datums X', Y'. A "longitudinal datum" Y' is a datum extending in the longitudinal direction, and a "lateral datum" X' is a datum extending in the lateral direction.

The fixture 30 of FIG. 2 includes a lateral wall 32 and a longitudinal finger 34, the lateral wall 32 corresponding to the lateral datum X' and the longitudinal finger 34 corresponding to the longitudinal datum Y'. The lateral wall 32 locates a side of the battery cell 26 in the lateral direction according to the lateral datum X'. The longitudinal finger 34 includes a rounded edge 36. In one form, the rounded edge 36 extends along a length of the longitudinal finger 34, locating a side of the battery cell 26 with the longitudinal datum Y'. In another form not shown, the rounded edge 36 extends only along a portion of the longitudinal finger 34. The rounded edge 36 of the longitudinal finger 34 extends to the battery cell 26 to provide the longitudinal datum Y'. The fixture 30 further includes a stabilizing finger 38 opposite the longitudinal finger 34. The stabilizing finger 38 secures a side of the battery cell 26 opposing the side contacting the longitudinal finger 34.

The fixture 30 includes a pair of openings 39 through which the of support pillars 28 extend. The openings 39 and the support pillars 28 are arranged such that the lateral wall 32 defines the lateral datum X' and the longitudinal finger 34 defines the longitudinal datum Y', thereby dimensionally locating the battery cell 26 in the lateral and longitudinal directions. The form illustrated herein includes two openings 39 for two support pillars 28, however, it should be understood that a different number and/or size/shape of openings 39 for a different number of support pillars 28 are within the teachings of the present disclosure.

Figure 3:
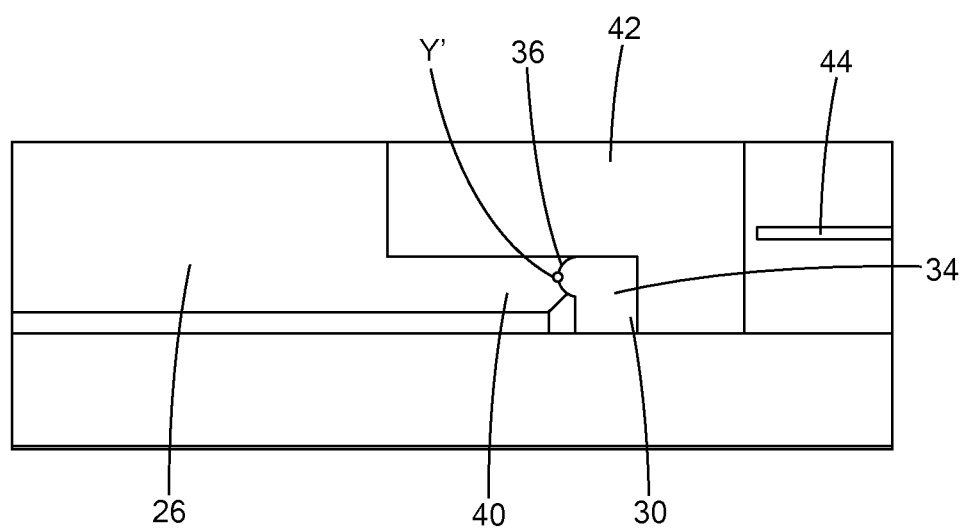
FIG. 3 is a side cross-sectional view of the locating fixtures according to the present disclosure.

With reference to FIG. 3, the rounded edge 36 of the longitudinal finger 34 protrudes toward the battery cell 26. In this form, the rounded edge 36 is semicircular, and the curvature of the rounded edge 36 is determined to provide the longitudinal datum Y'. The rounded edge 36 has an outermost line, shown as a point in the side view of FIG. 3, and the battery cell 26 contacts the outermost line of the rounded edge 36. The outermost line defines the longitudinal datum Y'.

As further shown, the battery cell 26 includes a lower portion 40 that contacts the rounded edge 36 and an upper portion 42 that includes an electrical terminal 44. The electrical terminal 44 provides electricity from the battery cell 26 via a circuit (not shown) connected to the electrical terminal 44. The lower portion 40 of the battery cell is narrower than upper portion 42 such only the lower portion 40, and not the upper portion 42, contacts the rounded edge 36 of the longitudinal finger 34. That is, the lower portion 40 is narrower than the upper portion 42 to be the specified portion of the battery cell 26 to provide dimensional location of the battery, such that if the upper portion 42 contacts the rounded edge 36, the battery cell 26 would be mislocated. Such a "poka-yoke" design reduces errors and misalignment in installation of the battery cells 26. Further, the fixture 30 aligns the battery cell 26 such that the electrical terminal 44 is properly positioned to be connected to the circuit.

Figure 4A:
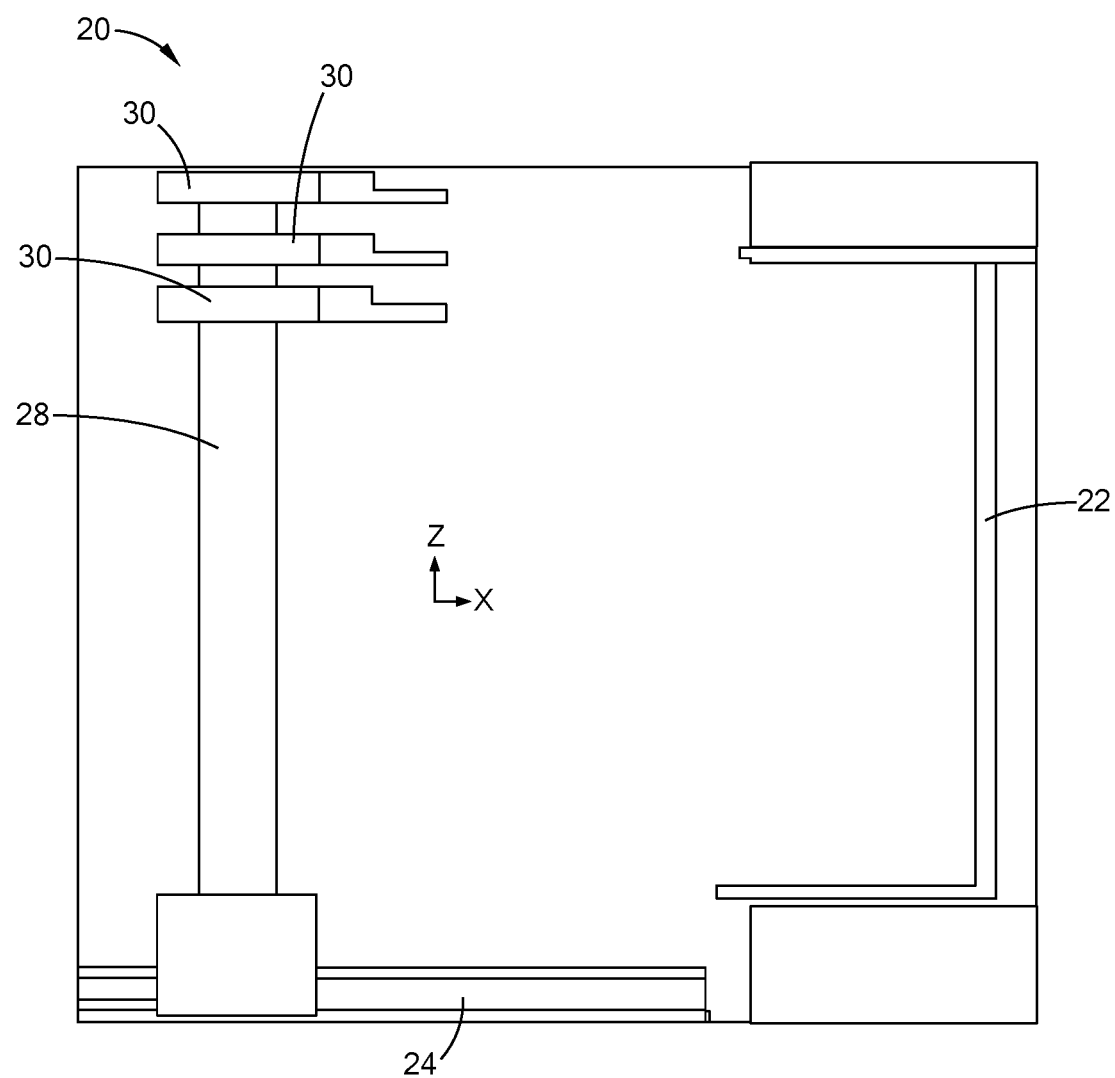
FIG. 4A is a side view of the battery module locating tool stacking battery cells according to the present disclosure.

With reference to FIGS. 4A-4D, the battery module locating tool 20 locates the battery cells 26 into the stack in the battery frame 22. As shown in FIG. 4A, the support pillars 28 are spaced away from the battery frame 22 prior to forming the battery module, and the fixtures 30 are arranged on the support pillars 28. As described above, two support pillars 28 support the fixtures 30, one of which is shown in the side view of FIG. 4A. To form the battery module 10, the support pillar 28 is moved sequentially along the track 24 toward and away the battery frame 22 as individual battery cells 26 are located, as described in greater detail below.

Figure 4B:
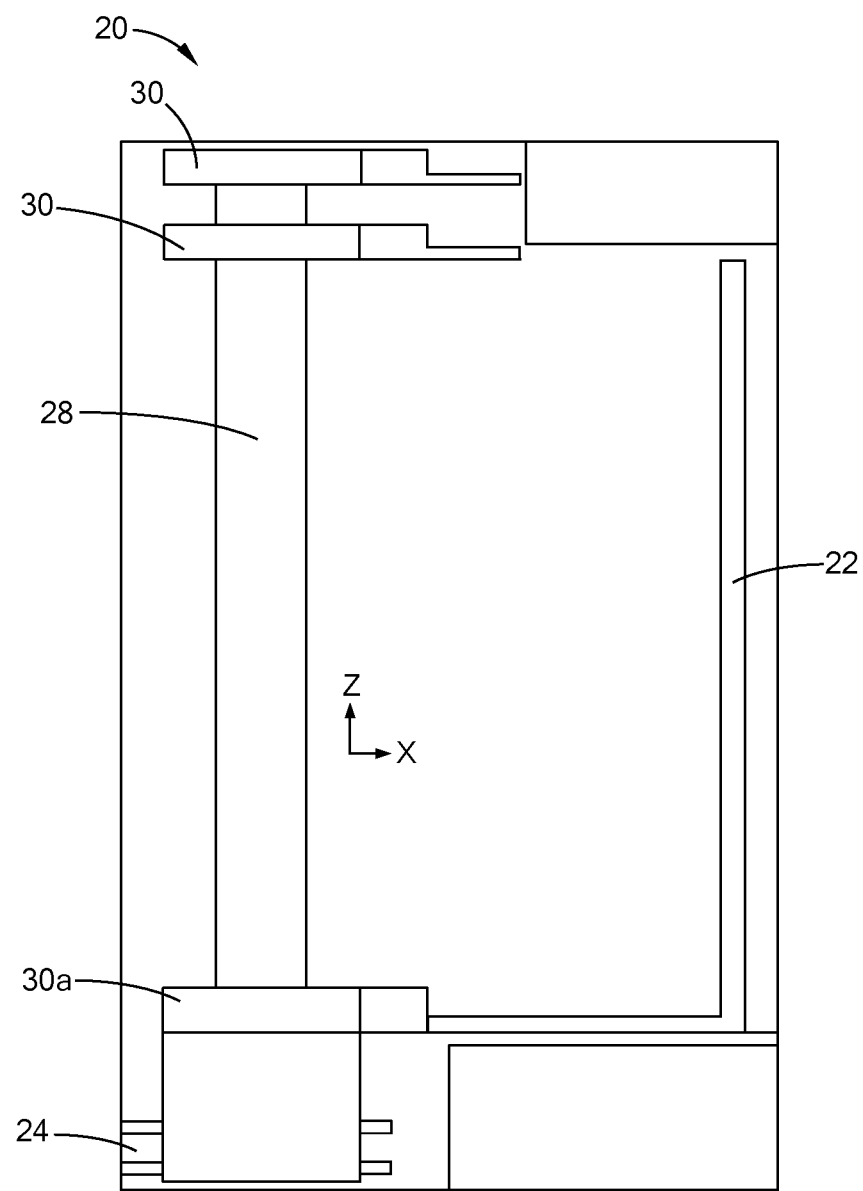
FIG. 4B is a side view of the battery module locating tool stacking battery cells according to the present disclosure.

As shown in FIG. 4B, the support pillar 28 is moved toward the battery frame 22 and a first fixture 30*a* is translated vertically down the support pillar 28. As described above, the support pillar 28 moves along the track 24 (or another element such as a bearing or a wheel, not shown) longitudinally toward the battery frame 22. The first fixture 30*a* slides vertically down the support pillar 28 and contacts the battery frame 22 to receive a first battery cell 26*a* of the stack. Variations in tolerances of the size of the first fixture 30a when contacting the battery frame 22 may cause the first battery cell 26a to be located slightly misaligned relative to an intended position, contributing to tolerance stackup. Locating the first battery cell 26a according to the datums X', Y' reduces the misalignment and the tolerance stackup, improving operation of the battery module 10.

Figure 4C:
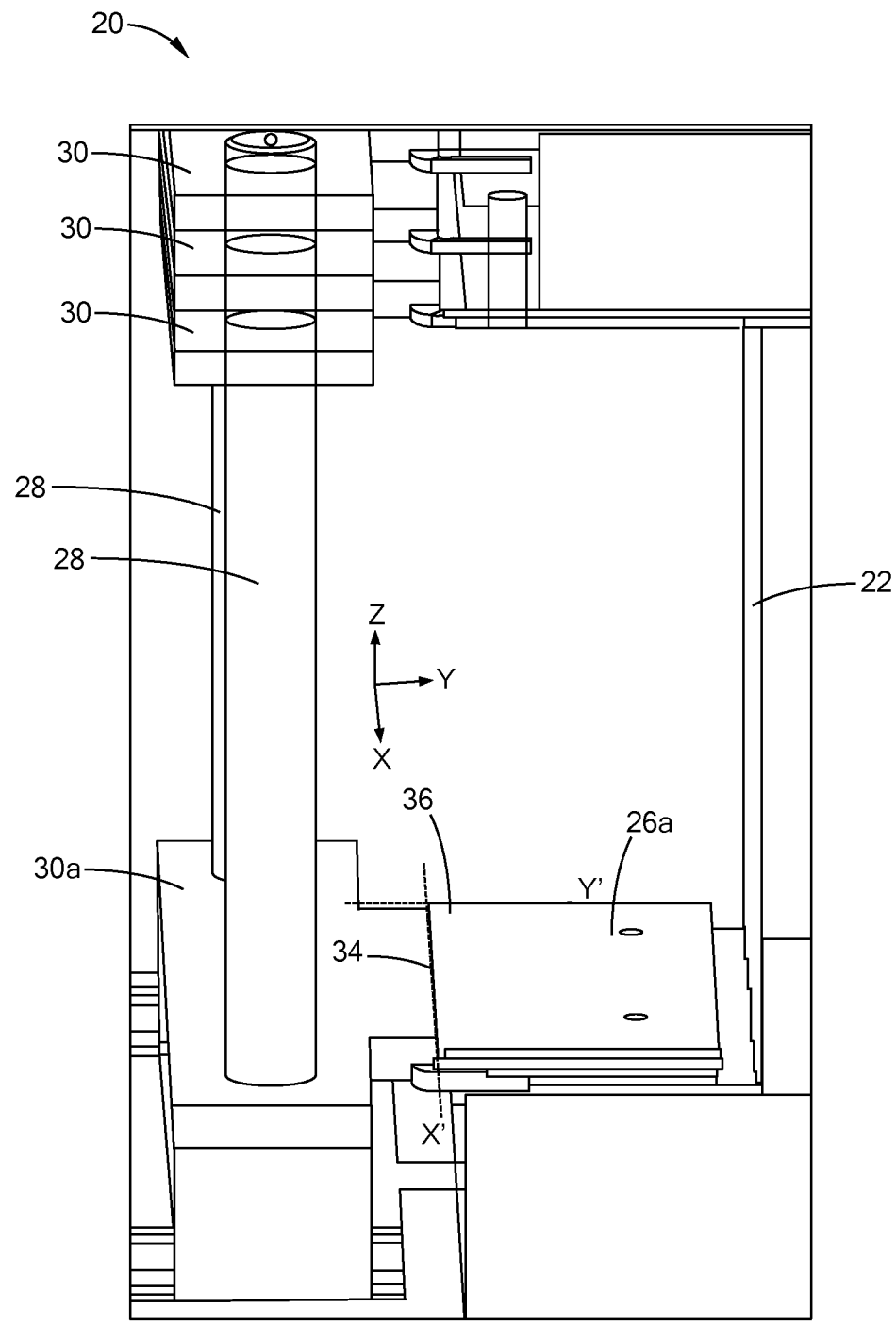
FIG. 4C is a perspective view of the battery module locating tool stacking battery cells according to the present disclosure.

As shown in FIG. 4C, once the first fixture 30a is located on the battery frame 22, a first battery cell 26a is placed onto the first fixture 30a. The lateral wall 32 and the longitudinal finger 34 of the first fixture 30a locate the battery cell 26a to the lateral and longitudinal datums X', Y', respectively. The first fixture 30a thus locates the battery cell 26a in the battery frame 22 to begin assembly of the stack of battery cells 26.

Figure 4D:
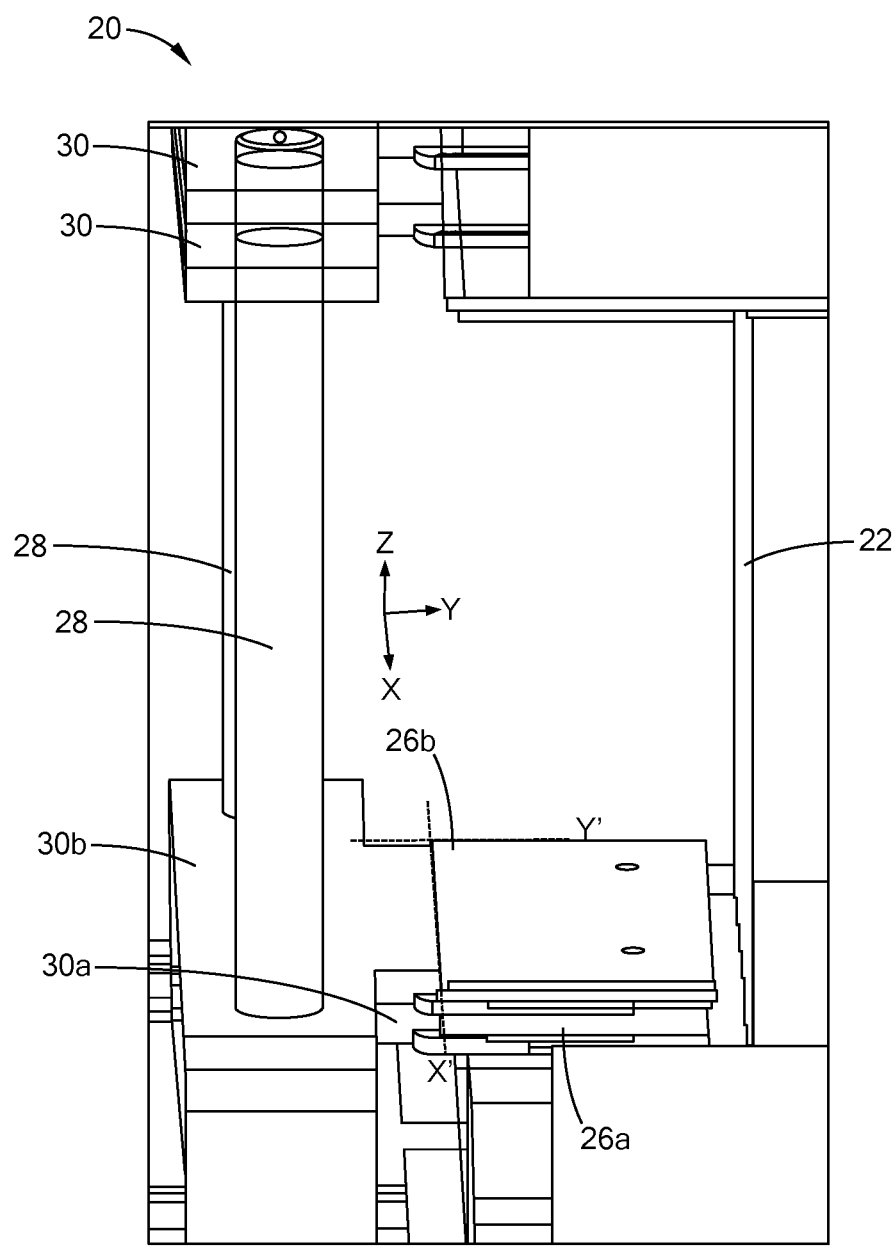
FIG. 4D is a perspective view of the battery module locating tool stacking battery cells according to the present disclosure.

Referring now to FIG. 4D, once the first battery cell 26a is located according to the datums X', Y', a second fixture 30b is lowered onto the first fixture 30a. The second fixture 30b locates a second battery cell 26b with the lateral and longitudinal datums X', Y', thereby locating the second battery cell 26b relative to the first battery cell 26a. Thus, the stack is formed from successive fixtures 30 and respective battery cells 26 located onto each other, each battery cell 26 aligned to lateral and longitudinal datums X', Y' to reduce tolerance stackup, or dimensional variation, to improve dimensional control of the stack of battery cells 26. In the form illustrated herein, the fixtures 30 locate the battery cells 26 into a vertical stack; in another form, the fixtures 30 locate the battery cells 26 into a horizontal stack. Further, it should be understood that the battery module locating tool 20 and the fixtures 30 may be oriented in other dimensions/directions other than vertical or horizontal, and combinations thereof, while remaining within the scope of the present disclosure.

Figure 5A:
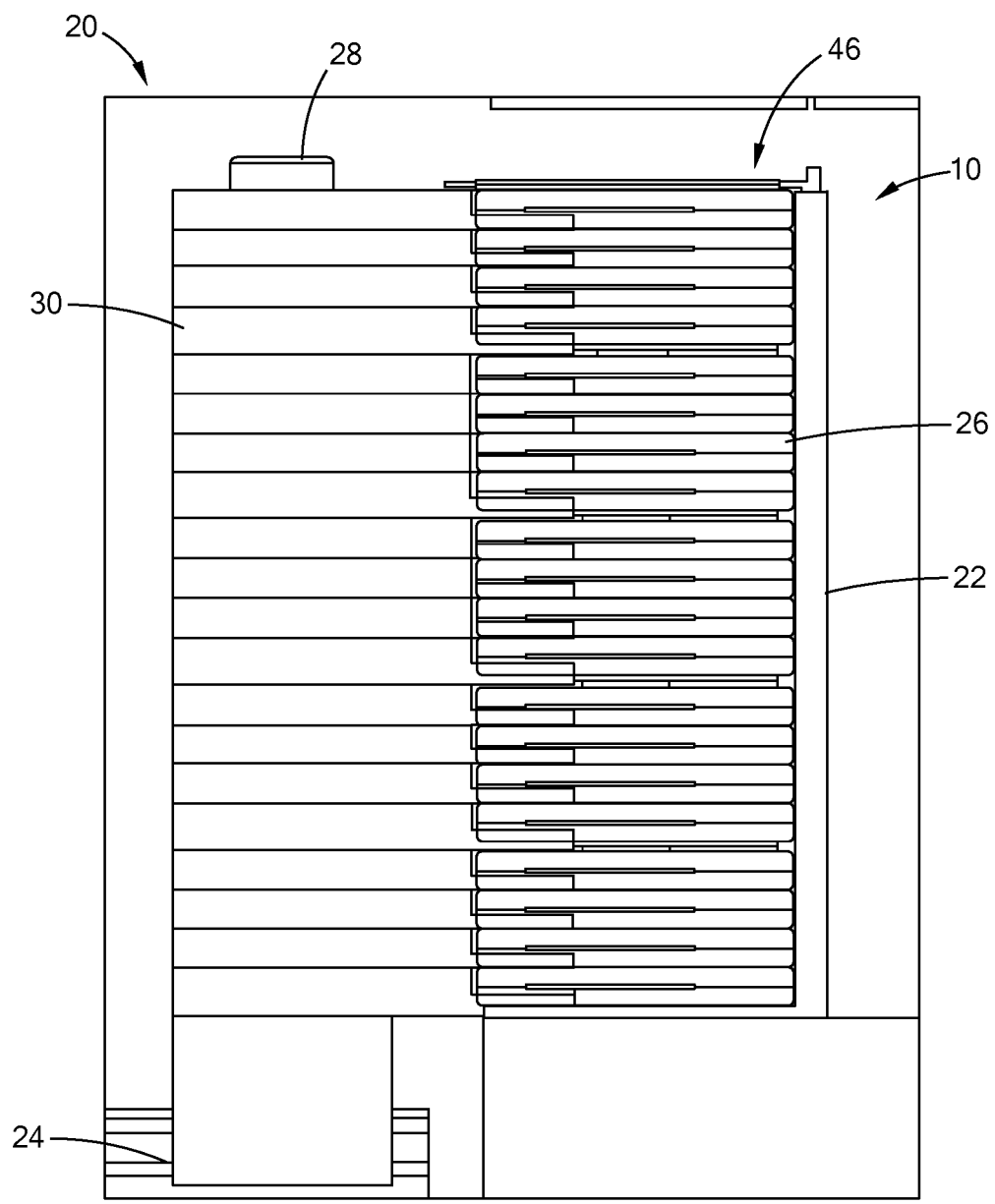
FIG. 5A is a side view of the battery module locating tool translated away from a stack of battery cells according to the present disclosure.
Figure 5B:
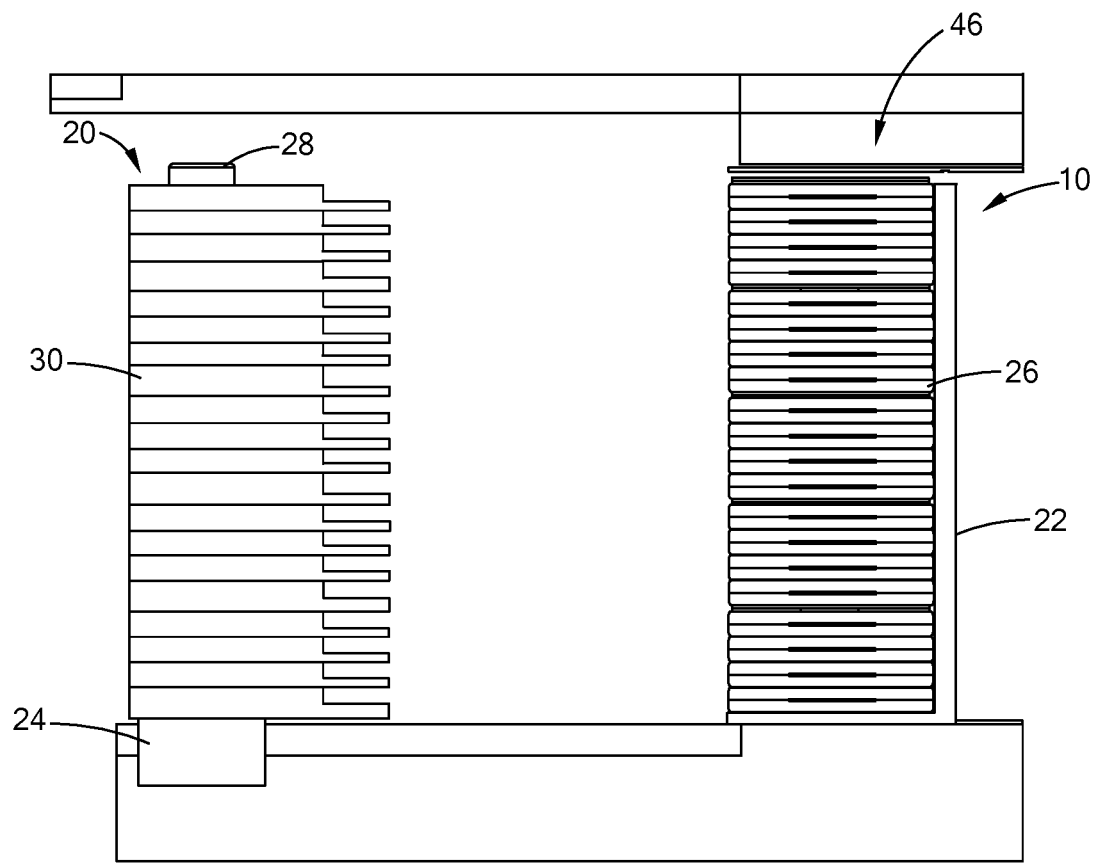
FIG. 5B is a side view of the battery dule locating tool translated away from a stack of battery cells according to the present disclosure.

With reference to FIGS. 5A-5B, upon locating the plurality of battery cells 26 into a stack 46 of the battery module 10, the battery module locating tool 20 is moved away from the battery frame 22 along the track 24 When a specified number of cells 26 are located into the stack 46, the support pillar 28 is moved along the track 24 in the longitudinal direction away from the battery frame 22. In the form illustrated herein, twenty (20) fixtures 30 locate twenty (20) battery cells 26 into the stack 46. It should be understood, however, that it is within the scope of the disclosure for a different number of fixtures 30 to locate a different number of battery cells 26 into the stack 46. Thus, the illustration of twenty (20) fixtures 30 and twenty (20) battery cells 26 is merely exemplary and should not be construed as limiting the scope of the present disclosure.

The stack 46 then remains in the battery frame 22 after removal of the battery module forming tool 20, and the cells 26 are adhered together via a weld and/or an adhesive (not shown). Alternatively, the cells 26 are adhered together prior to removal of the battery module forming tool 20. Upon adhering the battery cells 26, the stack 46 is ready to be connected to an electrical circuit/power leads (not shown) and to provide electricity to the battery module 10. The battery module 10 is then removed from the track 24 and a new battery frame 22 is placed to receive battery cells 26 located by the fixtures 30. The battery module forming tool 20 is thus reusable to form a new battery module 10.

Figure 6:
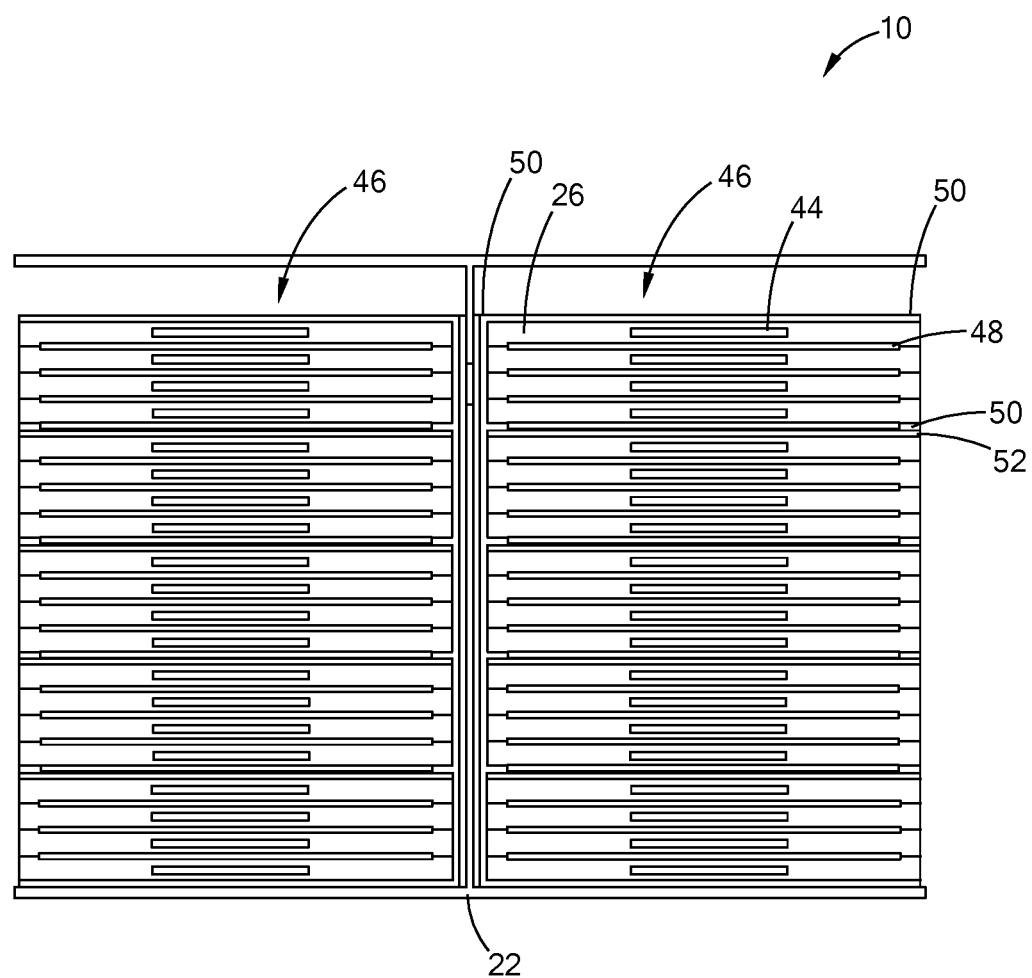
FIG. 6 is a side cross-sectional view of a completed battery module according to the present disclosure.

With reference to FIG. 6, the battery module 10 includes two stacks 46 of battery cells 26 housed in the battery frame 22. Each stack 46 includes a plurality of battery cells 26 adhered or secured together to locate terminals 44 of the battery cells 26 for connection to an electrical circuit. An adhesive 48, such as an adhesive tape, is disposed between adjacent battery cells 26 and adheres adjacent surfaces of the battery cells 26 to each other. During the location of the battery cells 26, the adhesive 48 of the first battery cell 26a contacts the second battery cell 26b, adhering the first battery cell 26a to the second battery cell 26b.

Support pads 50 separate groups of the battery cells 26 from each other, shown as groups of four battery cells 26. The support pads 50 absorb and distribute loads received by the frame 22, thereby reducing loads transferred to the battery cells 26. The support pads 50 extend in the lateral and longitudinal directions along specific battery cells 26 and in the vertical direction along the stack 46 to absorb and distribute loads in three dimensions.

Insulative sheets 52, such as mica, are placed between the groups of the battery cells 26 to absorb heat from the battery cells 26. The support pads 50 and insulative sheets 52 are placed on the battery cells 26 while the fixtures 30 locate the battery cells 26 according to the lateral and longitudinal datums X', Y'. In one form, upon placing a fourth battery cell 26 onto a fourth fixture 30, an insulative sheet 52 and a support pad 50 are placed onto the fourth battery cell 26. Then, a fifth fixture 30 is lowered onto the fourth fixture 30, and a fifth battery cell 26 is located onto the fifth fixture 30, contacting the support pad 50. In the form illustrated herein, the battery module 10 includes two vertical stacks 46 of battery cells 26; in another form, the stacks 46 are arranged horizontally; in yet another form, the battery module 10 includes a different number of stacks 46. These and other variations of battery stack configurations should be construed as being within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery module locating tool comprising:
   a support pillar; and
   a plurality of fixtures supported on the support pillar, each fixture individually translatable along the support pillar and arranged to locate a battery cell according to a longitudinal datum and a lateral datum,
   wherein the support pillar is movable toward a battery frame onto which the battery cell is located.

2. The battery module locating tool of claim 1, further comprising a track, the support pillar and the plurality of fixtures being slidable along the track toward the battery frame.

3. The battery module locating tool of claim 2, wherein the plurality of fixtures are configured to locate a plurality of battery cells vertically along the battery frame.

4. The battery module locating tool of claim 1, wherein each fixture includes a lateral wall and a longitudinal finger, the lateral wall corresponding to the lateral datum and the longitudinal finger corresponding to the longitudinal datum.

5. The battery module locating tool of claim 4, wherein the longitudinal finger includes a rounded edge.

6. The battery module locating tool of claim 5, wherein the rounded edge extends along a length of the longitudinal finger.

7. The battery module locating tool of claim 1, wherein each fixture is arranged to locate an adhesive disposed on a vertical surface of a respective battery cell onto a vertical surface of an adjacent battery cell.

8. The battery module locating tool of claim 1, wherein the plurality of fixtures are arranged to locate a plurality of battery cells into a stack, and the plurality of fixtures are further arranged to move away from the battery cells upon completion of the stack.

9. The battery module locating tool of claim 8, wherein the support pillar is movable along a track to move the fixtures away from the stack.

10. The battery module locating tool of claim 1, wherein each fixture is a same size as each other fixture.

11. The battery module locating tool of claim 1, further comprising a track, the support pillar and the plurality of fixtures being slidable along the track.

12. A method for assembling a plurality of battery cells, the method comprising:
    locating each cell of the plurality of battery cells with individual locating fixtures, each locating fixture comprising a lateral datum and a longitudinal datum;
    stacking individual battery cells onto each other with respective individual locating fixtures to form a stack of battery cells; and
    removing the individual locating fixtures after forming the stack of battery cells.

13. The method of claim 12, further comprising placing a first battery cell against a first locating fixture, thereby locating the first battery cell with the lateral datum and the longitudinal datum, lowering a second locating fixture onto the first locating fixture, and then placing a second battery cell onto the second locating fixture.

14. The method of claim 12, wherein each locating fixture includes a lateral wall and a longitudinal finger, the lateral wall comprising the lateral datum and the longitudinal finger comprising the longitudinal datum.

15. The method of claim 14, wherein the longitudinal finger includes a rounded edge.

16. The method of claim 12, further comprising moving the locating fixtures away from the stack in a longitudinal direction.

17. The method of claim 16, further comprising moving the locating fixtures along a track away from the stack.

18. The method of claim 12, further comprising adhering each battery cell to an adjacent battery cell with an adhesive.

19. The method of claim 12, wherein each locating fixture is a same size as each other locating fixture.

20. A battery module locating tool comprising:
    a support pillar; and
    a plurality of fixtures supported on the support pillar, each fixture including a longitudinal finger and a lateral wall,
    wherein each fixture is individually translatable along the support pillar and arranged to align a battery cell between the longitudinal finger and the lateral wall to a specified alignment.

* * * * *